US00RE41431E

(19) United States
(12) Reissued Patent
Böhnke et al.

(10) Patent Number: US RE41,431 E
(45) Date of Reissued Patent: Jul. 13, 2010

(54) SYNCHRONIZATION SYMBOL STRUCTURE USING OFDM BASED TRANSMISSION METHOD

(75) Inventors: Ralf Böhnke, Esslingen (DE); Thomas Dölle, Chemnitz (DE); Tino Puch, Bonn (DE)

(73) Assignee: Sony Corporation, Tokyo (JP)

(21) Appl. No.: 12/259,018

(22) Filed: Oct. 27, 2008

Related U.S. Patent Documents

Reissue of:
(64) Patent No.: 6,654,339
Issued: Nov. 25, 2003
Appl. No.: 09/479,281
Filed: Jan. 6, 2000

(30) Foreign Application Priority Data

Jan. 28, 1999 (EP) ..... 99100263
Feb. 22, 1999 (EP) ..... 99103379

(51) Int. Cl.
*H04J 11/00* (2006.01)

(52) U.S. Cl. ..... 370/203; 370/208; 370/350; 375/355

(58) Field of Classification Search ..... None
See application file for complete search history.

(56) References Cited

U.S. PATENT DOCUMENTS

| | | | |
|---|---|---|---|
| 5,450,456 | A | 9/1995 | Mueller |
| 5,732,113 | A | 3/1998 | Schmidl et al. |
| 6,160,791 | A | 12/2000 | Böhnke |
| 6,160,821 | A | 12/2000 | Dölle et al. |
| 6,407,846 | B1 | 6/2002 | Myers et al. |
| 6,438,173 | B1 | 8/2002 | Stantchev |
| 6,452,987 | B1 | 9/2002 | Larson et al. |
| 6,470,055 | B1 | 10/2002 | Feher |
| 6,507,733 | B1 | 1/2003 | Krupezevic et al. |
| 6,535,501 | B1 | 3/2003 | Böhnke |
| 6,539,215 | B1 | 3/2003 | Brankovic et al. |
| 6,545,997 | B1 | 4/2003 | Böhnke et al. |
| 6,557,139 | B2 | 4/2003 | Böhnke |

(Continued)

FOREIGN PATENT DOCUMENTS

| | | |
|---|---|---|
| CA | 2 291 847 | 9/2005 |
| EP | 0 836 303 | 4/1998 |
| EP | 0 869 646 | 10/1998 |

(Continued)

OTHER PUBLICATIONS

Cimini et al, Peak–to–Average Power Ratio Reduction of an OFDM Signal Using Partial Transmit Sequences, IEEE, 5 pages, 1999.*

(Continued)

*Primary Examiner*—Frank Duong
(74) *Attorney, Agent, or Firm*—Frommer Lawrence & Haug LLP; William S. Frommer; Thomas F. Presson

(57) ABSTRACT

The present invention proposes a method for generating synchronization bursts for OFDM transmission systems. The symbols of a predefined symbol sequence are mapped according to a predefined mapping scheme on subcarriers of the OFDM systems by a mapping unit (2), wherein the symbols of the predefined symbol sequence represent subcarriers of the OFDM system with nonzero amplitudes. A synchronization burst is generated by a inverse fast Fourier transforming unit (3) transforming the subcarriers of the OFDM system mapped to said predefined symbol sequence. The mapping (2) of the symbols of the predefined symbol sequence is set such that the resulting time domain signal of the synchronization burst represents a periodic nature. According to the invention the predefined symbol sequence is set such that the envelope fluctuation of the time domain signal of the synchronization burst is minimized. Therefore advantageous symbol sequences reducing said the envelope fluctuation of the time domain signal are proposed.

9 Claims, 9 Drawing Sheets

U.S. PATENT DOCUMENTS

| | | | |
|---|---|---|---|
| 6,567,374 | B1 | 5/2003 | Böhnke et al. |
| 6,567,383 | B1 | 5/2003 | Böhnke |
| 6,609,010 | B1 | 8/2003 | Dolle et al. |
| 6,650,178 | B1 | 11/2003 | Brankovic et al. |
| 6,654,339 | B1 | 11/2003 | Böhnke et al. |
| 6,674,732 | B1 | 1/2004 | Boehnke et al. |
| 6,674,817 | B1 | 1/2004 | Dölle et al. |
| 6,704,562 | B1 | 3/2004 | Oberschmidt et al. |
| 6,724,246 | B2 | 4/2004 | Oberschmidt et al. |
| 6,728,550 | B1 | 4/2004 | Böhnke et al. |
| 6,731,594 | B1 | 5/2004 | Böhnke |
| 6,735,261 | B1 | 5/2004 | Oberschmidt et al. |
| 6,738,443 | B1 | 5/2004 | Böhnke et al. |
| 6,748,203 | B1 | 6/2004 | Brankovic et al. |
| 6,803,814 | B1 | 10/2004 | Krupezevic et al. |
| 6,917,580 | B2 | 7/2005 | Wang et al. |
| 7,012,882 | B2 | 3/2006 | Wang et al. |
| 7,106,821 | B2 | 9/2006 | Usui et al. |
| 7,145,955 | B1 | 12/2006 | Böhnke et al. |
| 7,154,975 | B1 | 12/2006 | Böhnke et al. |
| 7,184,725 | B2 | 2/2007 | Ruhm et al. |
| 2004/0196916 | A1 | 10/2004 | Böhnke et al. |
| 2006/0045219 | A1 | 3/2006 | Wang et al. |
| 2006/0133408 | A1 | 6/2006 | Nogueira-Nine et al. |
| 2006/0148906 | A1 | 7/2006 | Bieniarz et al. |
| 2006/0269008 | A1 | 11/2006 | Böhnke et al. |
| 2007/0036235 | A1 | 2/2007 | Böhnke et al. |
| 2007/0115827 | A1 | 5/2007 | Boehnke et al. |

FOREIGN PATENT DOCUMENTS

| | | |
|---|---|---|
| EP | 0 982 905 | 3/2000 |
| EP | 0 984 595 | 3/2000 |
| EP | 0 984 596 | 3/2000 |
| EP | 0 987 863 | 3/2000 |
| EP | 1 014 562 | 6/2000 |
| EP | 1 018 827 | 7/2000 |
| EP | 1 037 481 | 9/2000 |
| EP | 1 039 661 | 9/2000 |
| EP | 1 065 855 | 1/2001 |
| EP | 1 162 764 | 12/2001 |
| EP | 1 170 916 | 1/2002 |
| EP | 1 170 917 | 1/2002 |
| EP | 1 207 661 | 5/2002 |
| EP | 1 207 662 | 5/2002 |
| EP | 1 276 251 | 1/2003 |
| EP | 1 276 288 | 1/2003 |
| EP | 1 379 026 | 1/2004 |
| EP | 1 439 677 | 7/2004 |
| EP | 1 530 336 | 5/2005 |
| EP | 1 667 341 | 6/2006 |
| EP | 1 705 852 | 9/2006 |
| EP | 1 722 527 | 11/2006 |
| GB | 2 320 868 | 7/1998 |
| JP | 2000 209183 | 7/2000 |
| KR | 10 0712865 | 4/2007 |
| WO | WO 98 00946 | 1/1998 |

OTHER PUBLICATIONS

Dinis R et al: "Carrier Synchronization With CEPB–O-FDM" 1997 IEEE 47$^{th}$. Vehicular Technology Conference, Phoenix, May 4–7, 1997, vol. 3, No. Conf. 47, May 4, 1997 (May 4, 1997), pp. 1370–1374, XP000738586 Institute of Electrical and Electronics Engineers.

Bauml R W et al: "Reducing the Peak–to–Average Power Ratio of Multicarrier Modulation by Selected Mapping" Electronics Letters, vol. 32, No. 22, Oct. 24, 1996 (Oct. 24, 1996), p. 2056–2057, XP000643915.

Schmidl T M et al: "Low–Overheated, Low–Complexity Burst Synchronization for OFDM" 1996 IEEE International Conference on Communications (ICC), Converging Technologies for Tomorrow's Applications Dallas, Jun. 23–27, 1996, vol. 3, Jun 23, 1996 (Jun. 23, 1996), pp. 1301–1306, XP000625022 Institute of Electrical & Electronics Engineers ISBN: 0–7803–3251–2.

Mizoguchi et al: "A Fast Burst Synchronization Scheme for OFDM", IEEE, pp. 125–129, 1998.

* cited by examiner

PAPR: 2.24 dB
Dynamic Range: 7.01 dB

SYNCHRONIZATION SYMBOL STRUCTURE USING OFDM BASED TRANSMISSION METHOD

Matter enclosed in heavy brackets [ ] appears in the original patent but forms no part of this reissue specification; matter printed in italics indicates the additions made by reissue.

*Notice: More than one application has been filed for the reissue of U.S. Pat. No. 6,654,339. The reissue applications are 11/286,440, the instant application, and applications 12/258,799, 12/258,984, 12//258,939, 12/259,045 and 12/259,063, all filed Oct. 27, 2008.*

The present invention relates to a method for generating synchronization bursts for OFDM transmission systems, a method for synchronizing wireless OFDM systems, an OFDM transmitter as well as to a mobile communications device comprising such a transmitter.

The present invention relates generally to the technical field of synchronizing wireless OFDM (orthogonal frequency division multiplexing) systems. Thereby it is known to use a synchronization burst constructed using especially designed OFDM symbols and time domain repetitions.

Particularly from the document IEEE P802.11a/d2.0 "Draft supplement to a standard for telecommunications and information exchange between systems—LAN/MAN specific requirements—part 1: wireless medium access control (MAC) and physical layer (PHY) specifications: high-speed physical layer in the 5 GHz band" a synchronization scheme for OFDM systems is proposed. This document is herewith included by reference as far as it concerns the synchronization including the proposed implementation. Said known scheme will now be explained with reference to FIG. 6 to 8 of the enclosed drawings.

FIG. 6 shows the structure of the known synchronization field. As shown in FIG. 6 the synchronization field consists of so-called short symbols t1, t2, . . . t6 and two long symbols T1, T2. In view of the present invention particularly the short symbols t1, t2 . . . t6 are of interest. Among the short symbols t1, t2, . . . t6 used for the amplifier gain control (t1, t2, t3) and the course frequency offset and timing control only the symbols t1, t2, t3 and t4 are actually generated, whereas the symbols t5, t6 are cyclic extensions (copies of the symbols t1 and t2, respectively). It is to be noted that FIG. 5 shows only the synchronization preamble structure as the structure of the following signal field indicating the type of baseband modulation and the coding rate as well as the structure of further following data fields are not of interest in view of the present invention. For further details reference is made to said prior art document.

The symbols t1, t2, t3, t4 are generated by means of an OFDM modulation using selected subcarriers from the entire available subcarriers. The symbols used for the OFDM modulation as well as the mapping to the selected subcarriers will now be explained with reference to FIG. 6.

Each of the short OFDM symbols t1, . . . t6 is generated by using 12 modulated subcarriers phase-modulated by the elements of the symbol alphabet:

$S=\sqrt{2}(\pm 1\pm j)$

The full sequence used for the OFDM modulation can be written as follows:

$$S_{-24,24}=\sqrt{2}*\{1+j,0,0,0,1+j,0,0,0,-1-j,0,0,0,-1-j,0,0,0,1-j,0,0,0,-1-j,0,0,0,0\ 0,0,0,1+j,0,0,0,1+j,0,0,0,-1-j,0,0,0,1+j,0,0,0,-1+j,0,0,0,1+j\}$$

The multiplication by a factor of $\sqrt{2}$ is in order to normalize the average power of the resulting OFDM symbol.

The signal can be written as:

$$r_{SHORT}(t) = w_{SHORTi}(t) \sum_{k=-N_2/2}^{N_s/2} S_k \exp(j2\pi k\Delta_F t)$$

The fact that only spectral lines of $S_{-24,\ 24}$ with indices which are a multiple of 4 have nonzero amplitude results in a periodicity of $T_{FFT}/4=0.8$ μsec. The interval $T_{TSHORT1}$ is equal to nine 0.8 μsec periods, i.e. 7.2 μsec.

Applying a 64-point IFFT to the vector S, where the remaining 15 values are set to zero, four short training symbols t1, t2, t3, t4 (in the time domain) can be generated. The IFFT output is cyclically extended to result in 6 short symbols t1, t2, t3, . . . t6. The mapping scheme is depicted in FIG. 7. The so called virtual subcarriers are left unmodulated.

The way to implement the inverse Fourier transform is by an IFFT (Inverse Fast Fourier Transform) algorithm. If, for example, a 64 point IFFT is used, the coefficients 1 to 24 are mapped to same numbered IFFT inputs, while the coefficients −24 to −1 are copied into IFFT inputs 40 to 63. The rest of the inputs, 25 to 39 and the 0 (DC) input, are set to zero. This mapping is illustrated in FIG. 7. After performing an IFFT the output is cyclically extended to the desired length.

With the proposed inverse fast Fourier transform (IFFT) mapping as shown in FIG. 7 the resulting time domain signal consists of 4 periodically repeated short symbols t1, t2, t3, t4, and cyclically extended by a copy of t1, t2, which copy is depicted in FIG. 5 as t5, t6. Note that in the present case only spectral lines with indices which are a multiple of 4 have nonzero amplitude. Other periodic natures can be generated by setting other multiples of the spectral lines to nonzero amplitudes.

Though the known synchronization scheme is very effective, it provides for disadvantage regarding the time domain signal properties.

For OFDM (or in general multicarrier signals) the signal envelope fluctuation (named Peak-to-Average-Power-Ratio=PAPR) is of great concern. A large PAPR results in poor transmission (due to nonlinear distortion effects of the power amplifier) and other signal limiting components in the transmission system (e.g. limited dynamic range of the AD converter).

For synchronization sequences it is even more desirable to have signals with a low PAPR in order to accelerate the receiver AGC (automatic gain control) locking and adjusting the reference signal value for the A/D converter (the whole dynamic range of the incoming signal should be covered by the A/D converter resolution without any overflow/underflow).

Figure 1:
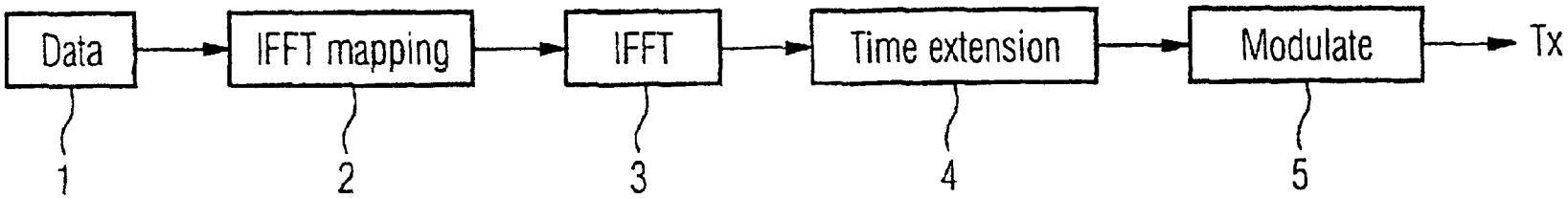

Therefore it is the object of the present invention to provide for a synchronization technique which bases on the known synchronization technique but which presents improved time domain signal properties to reduce the requirements for the hardware.

The above object is achieved by means of the feature of the independent claims. The dependent claims develop further the central idea of the present invention.

According to the present invention therefore a method for generating synchronization bursts for OFDM transmission systems is provided. Symbols of a predefined symbol sequence are mapped according to a predefined mapping scheme on subcarriers of the OFDM system wherein the symbols of the predefined symbol sequence represent subcarriers with nonzero amplitudes. A synchronization burst is generated by inverse fast Fourier transforming the subcarriers mapped with a predefined symbol sequence. According to the present invention the predefined symbol sequence is optimized such that the envelope fluctuation of the time domain signal (Peak-to-average-power-ratio) is minimized.

The predefined symbol sequence can be chosen such that the following equations are satisfied for all symbols of the predefined symbol sequence:

$$n=2m,$$

$$C_{i-1}=\pm C_{1-i},$$

n being the number of symbols of the predefined symbol sequence, m being an integer larger than one, C being the symbol value, and i being an integer running from 1 to m.

The mapping of the symbols of the predefined symbol sequence and the Inverse Fast Fourier Transform can be set such that the resulting time domain signal of the synchronization burst represents a periodic nature.

Alternatively the mapping of the symbols of the predefined symbol sequence and the Inverse Fast Fourier Transform is set such that one burst part of the synchronization burst in the time domain is generated and the periodic nature of the synchronization burst in the time domain is achieved by copying the one burst part.

The number of symbols of a symbol sequence (n) can for example be 12.

The above equations define generally the symbol sequences according to the present invention. The predefined symbol sequence can therefore be for example:

AAA −A −A −A −AA −A −AA −A, wherein A is a complex value.

Alternatively the predefined symbol sequence can be:

A −AAA −AAAAA −A −A −A, wherein A is a complex value.

Alternatively the following predefined symbol sequence can be used:

A B −A B −A −B B A −B A −B −A, wherein A, B are complex values.

As a further alternative the following sequence can be used:

A −B −A −B −A B −B A B A B −A, wherein A, B are complex values.

According to the present invention furthermore a method for synchronizing wireless OFDM systems is provided, wherein a synchronization burst is generated according to a method as set forth above and the synchronization burst is transmitted respectively before the transmission of data fields.

Thereby the time domain signals of the synchronization burst can be precomputed and stored in a memory, such that the computation of the time domain signal of the burst is only effected once.

According to the present invention furthermore a OFDM transmitter is provided comprising a mapping unit for mapping the symbols of a predefined symbols sequence according to a predefined mapping scheme on subcarriers of the OFDM system, wherein the symbols of a predefined symbols sequence represent the subcarriers of the OFDM system with nonzero amplitudes. Furthermore an inverse fast Fourier transforming unit is provided for generating a synchronization burst by inverse fast Fourier transforming the subcarriers of the OFDM mapped with said predefined symbols sequence. The mapping unit thereby is designed such that the resulting time domain signal of the synchronization burst represents a periodic nature. The mapping unit according to the present invention uses a predefined symbol sequence which is such that the envelope fluctuation of the time domain signal of the synchronization burst is minimized.

According to the present invention furthermore a mobile communications device such as set forth above is used.

With reference to the figures of the enclosed drawings referred embodiments of the present invention will now be explained.

Figure 2:
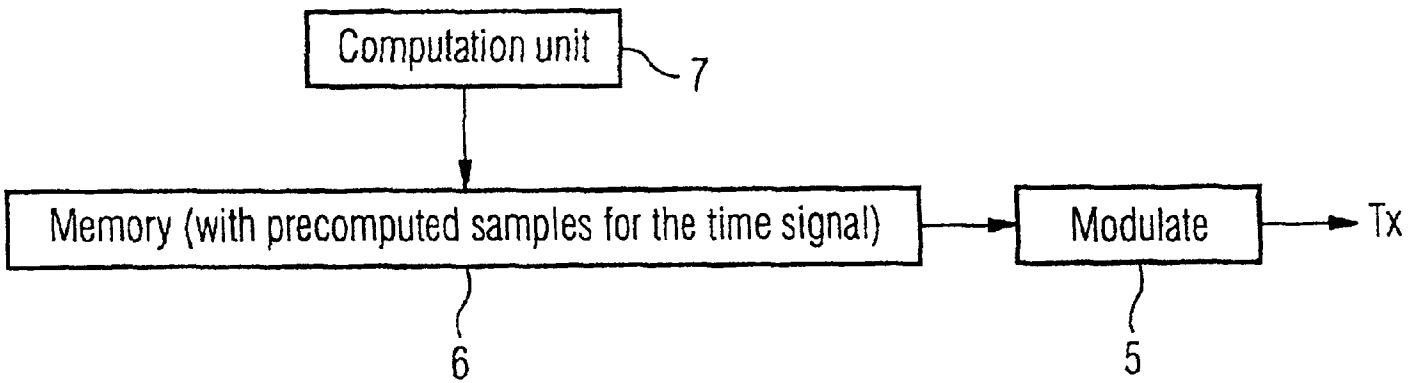
Figure 3:
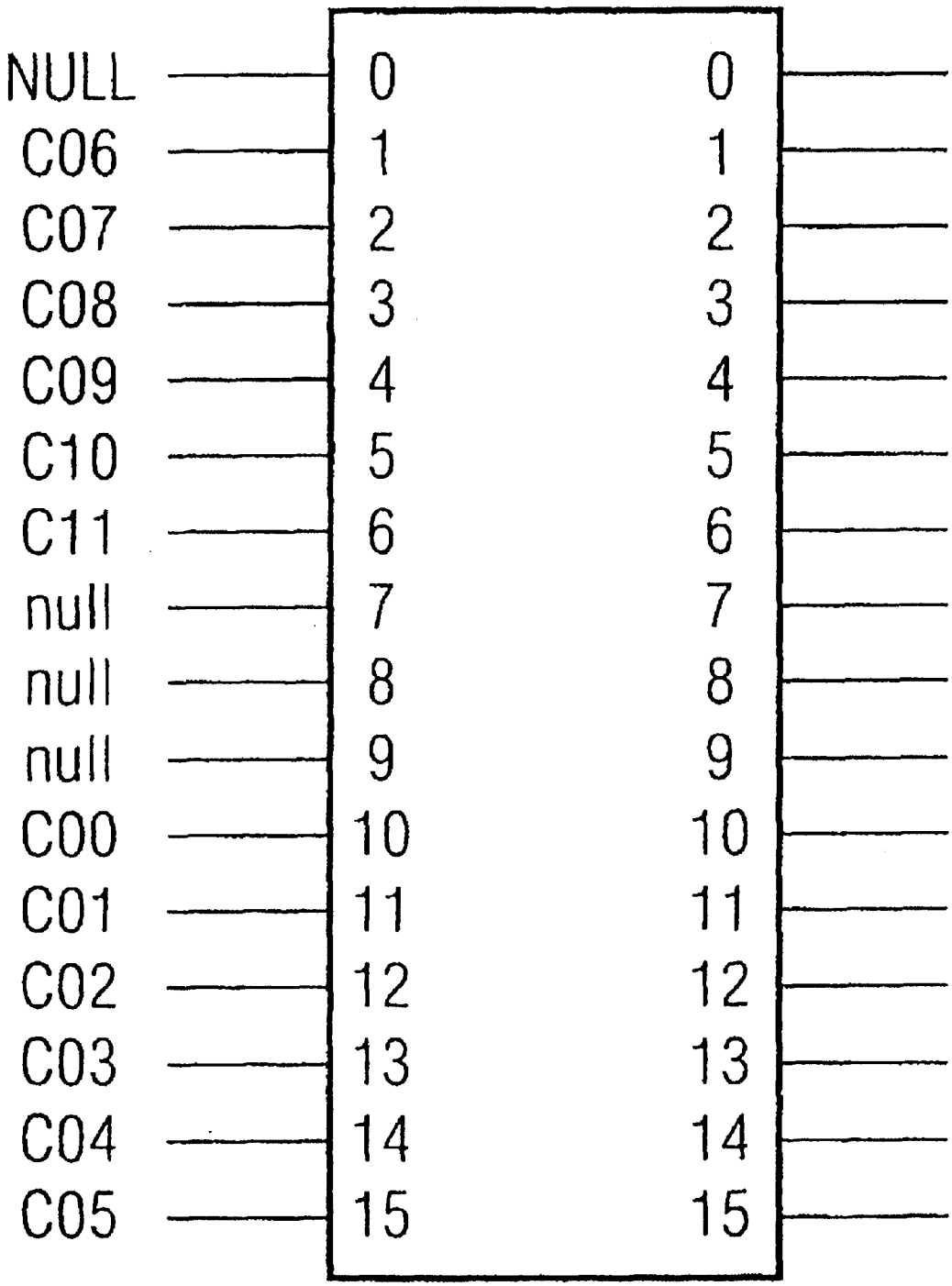
Figure 4A:
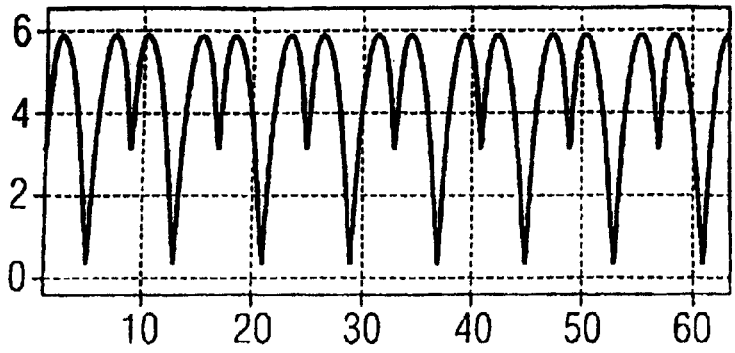
Figure 4B:
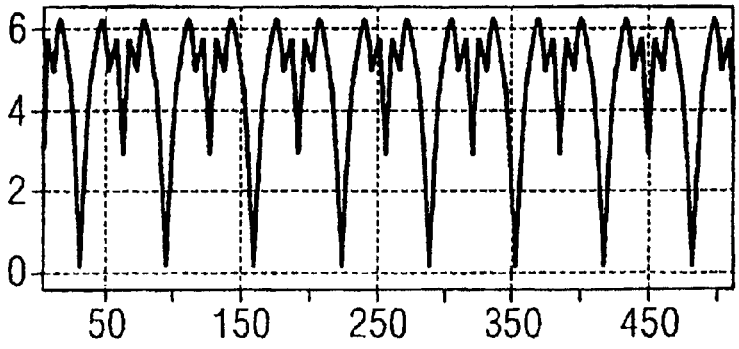
Figure 4C:
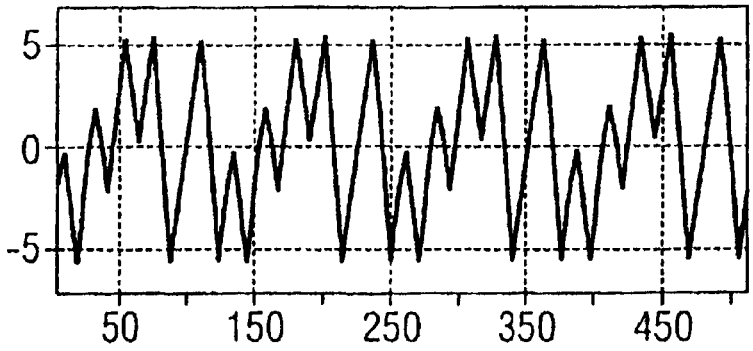
Figure 4D:
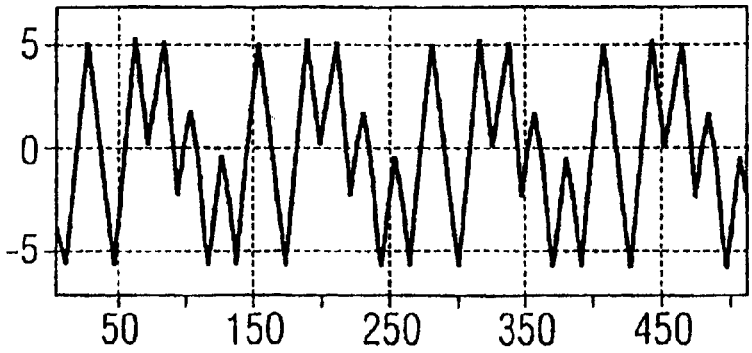
Figures 5A, 5B:
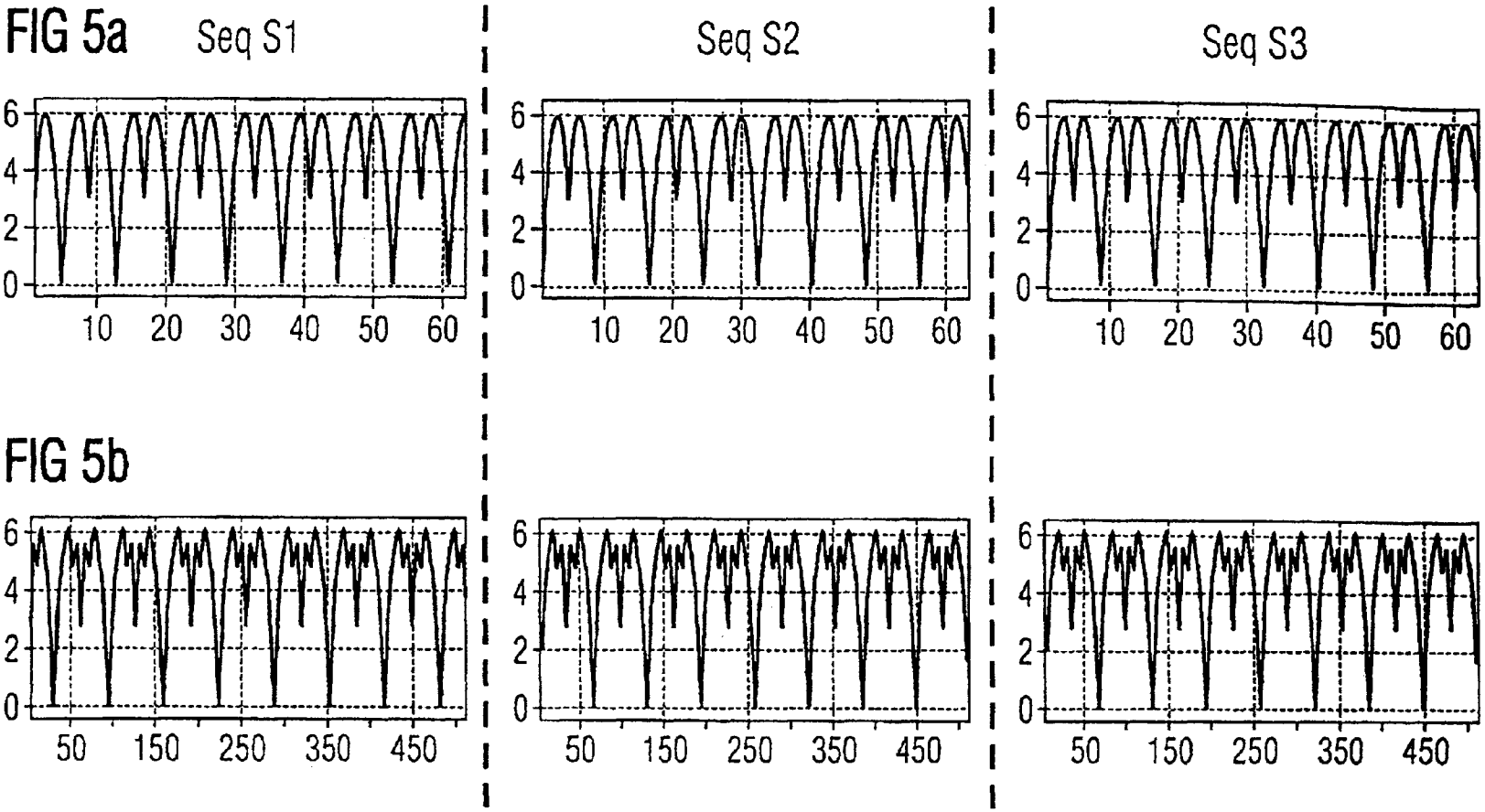
Figures 5C, 5D:
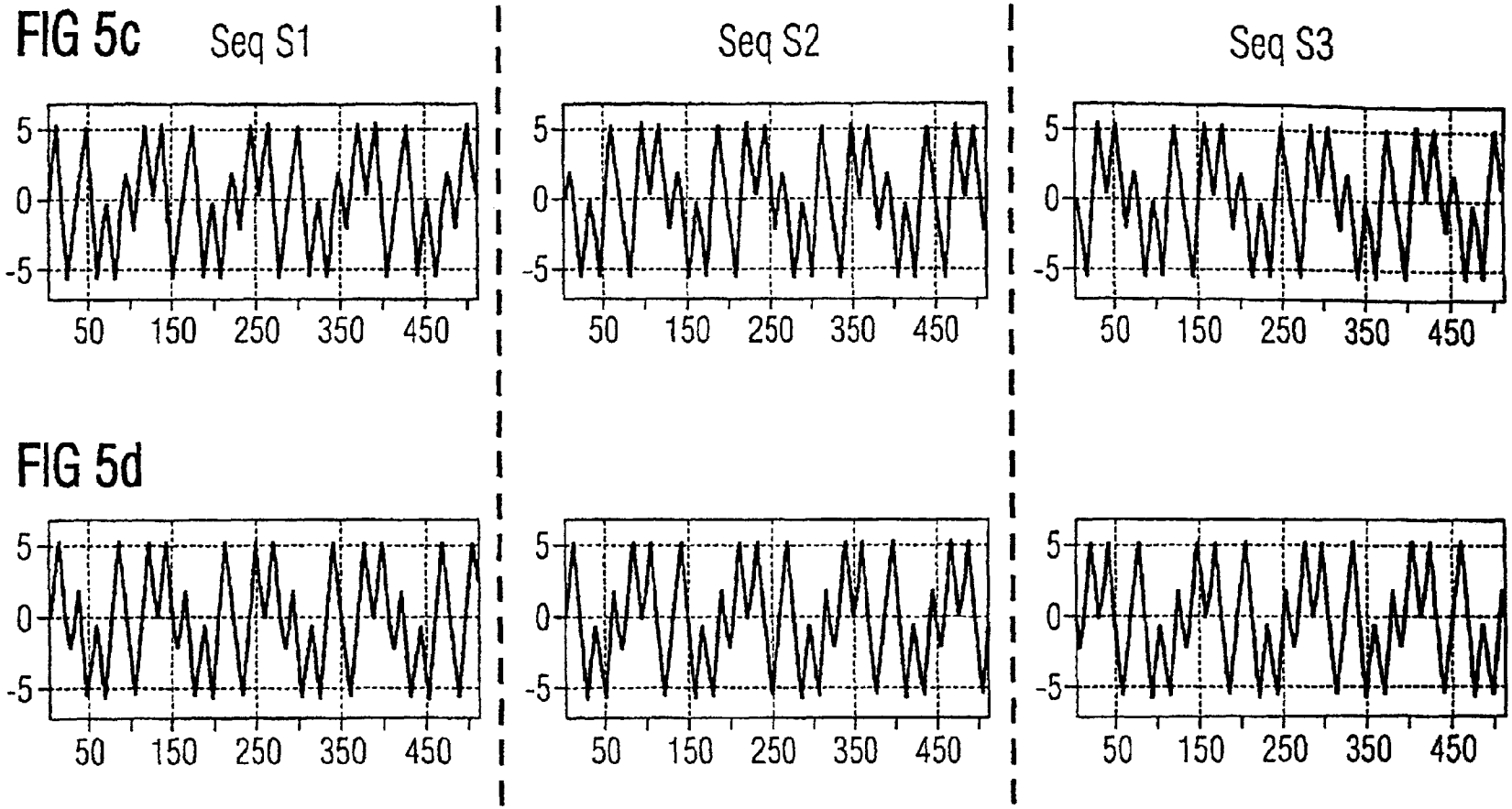
Figure 6:
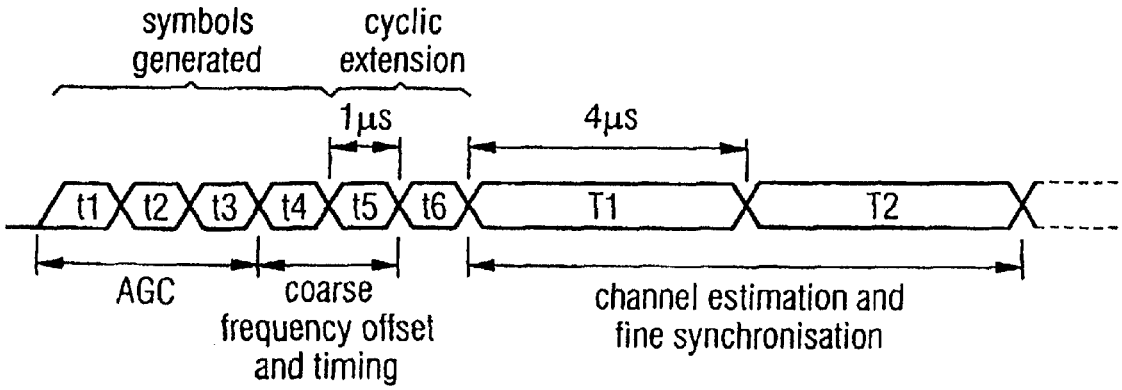
Figure 7:
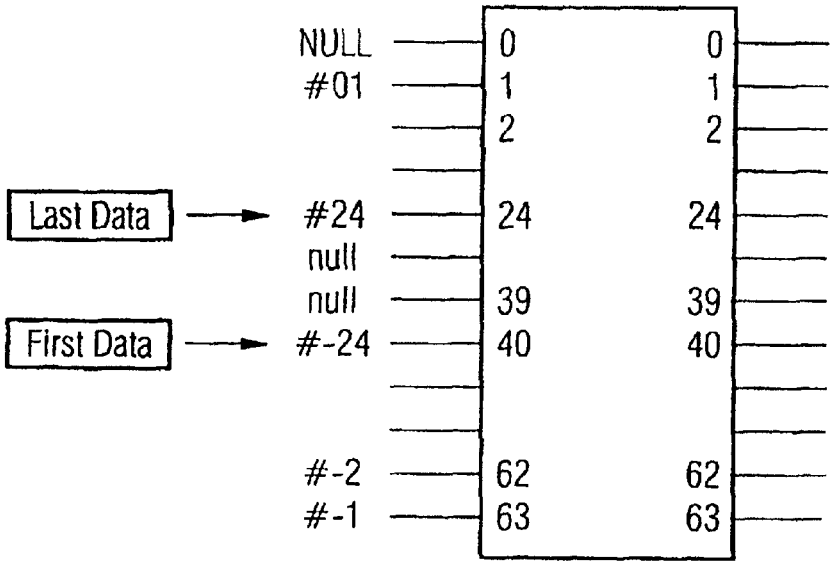
Figure 8A:
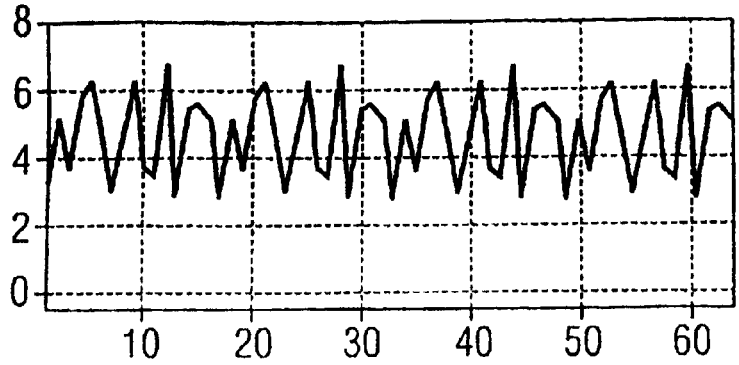
FIGS. 8a, 8b show the "absolute" (sqrt{In*+Quad *Quad}) value of the resulting time domain signal waveform with the sequences proposed by Lucent Technologies. Oversampling (8*) was considered in order to ensure the peak was captured correctly using the limited 64-point IFFT.
Figure 8B:
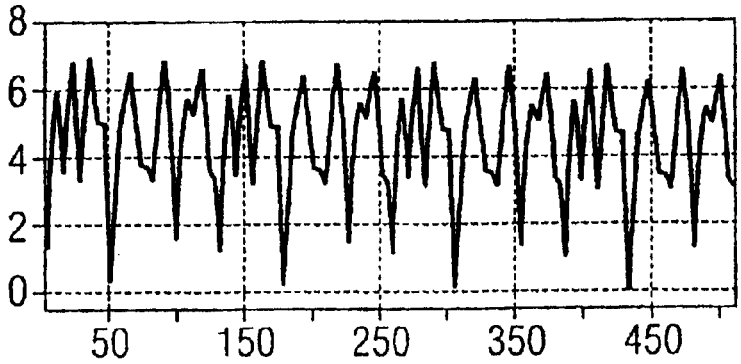
Figure 8C:
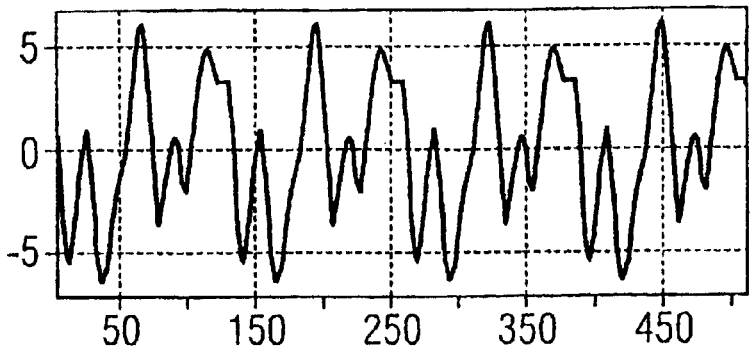
FIGS. 8c, 8d show the real and imaginary part of the resulting transmitted time domain waveform. The resulting PAPR is 2.9991 dB (no oversampling) and 3.0093 dB (with 8 times oversampling).
Figure 8D:
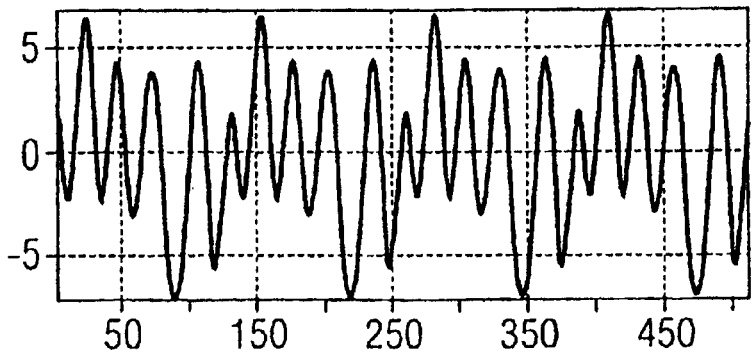
Figure 9A:
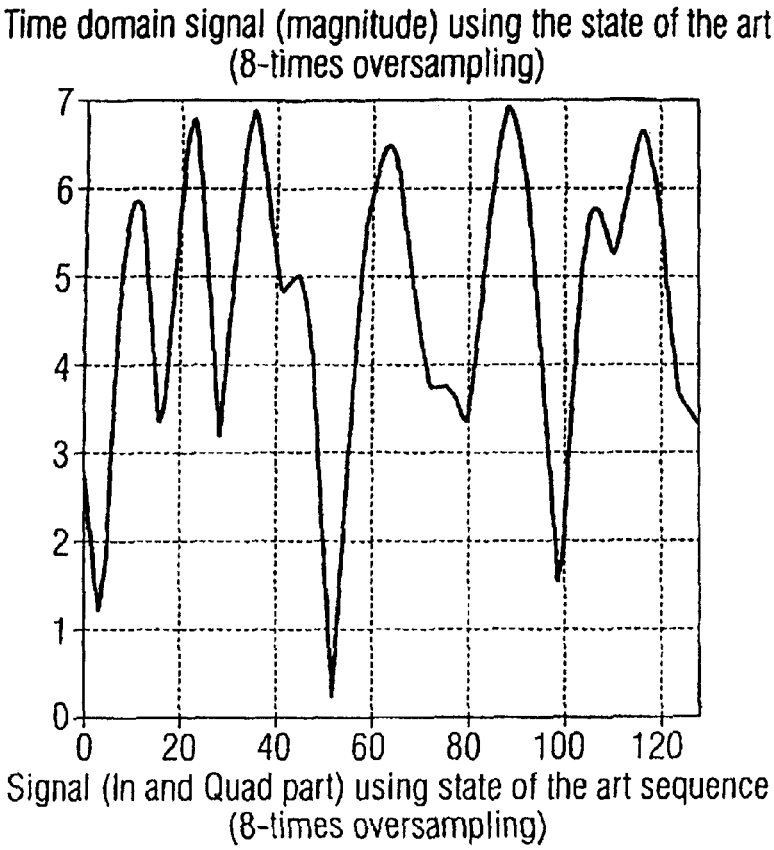
Figure 9B:
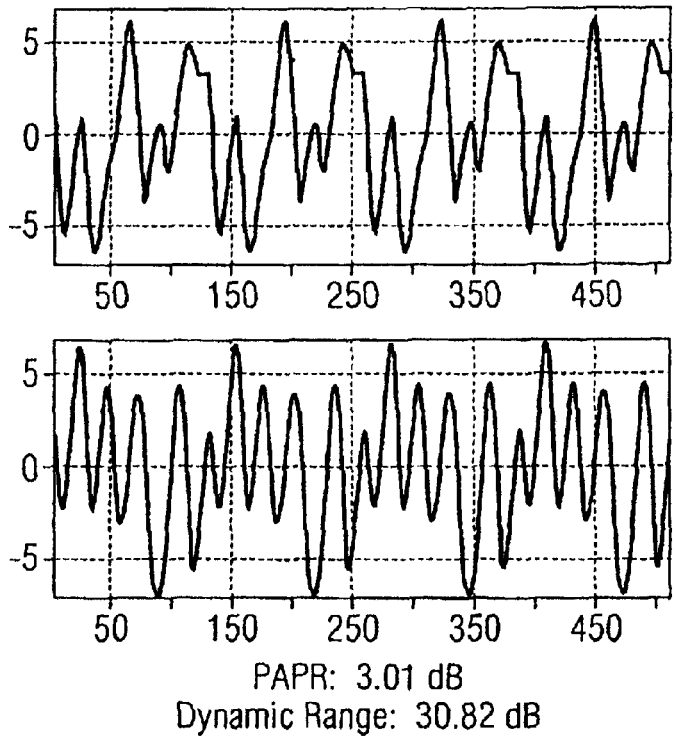
Figure 10A:
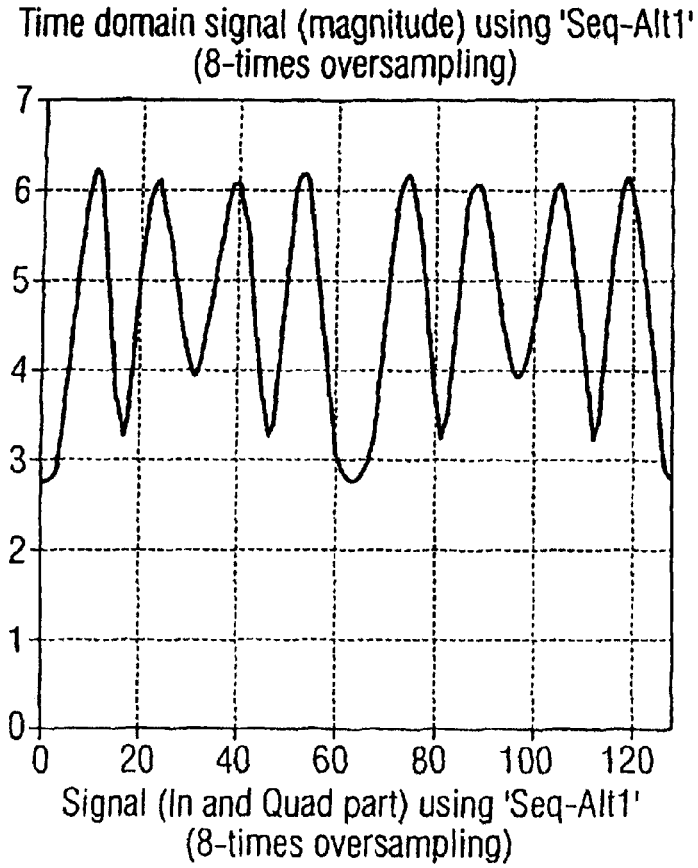
Figure 10B:
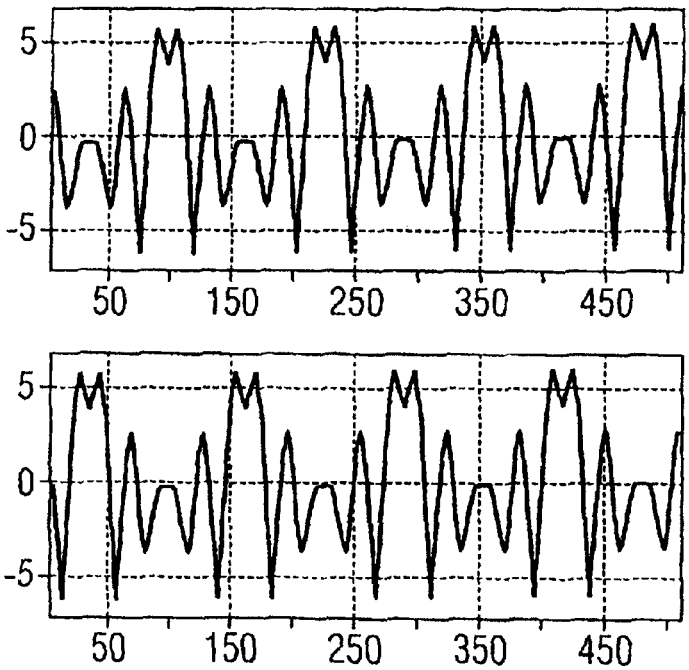

FIG. 1 shows schematically a transmitter according to the present invention, FIG. 2 shows an alternative embodiment for a transmitter according to the present invention, FIG. 3 shows an alternative mapping scheme according to the present invention, FIGS. 4a to 4d show the time domain signal properties achieved with the synchronization symbol structure using OFDM based transmission according to the present invention, FIGS. 5a to 5d show the time domain signal properties of synchronization symbol structures according to alternative embodiments of the present invention, FIG. 6 shows a synchronization preamble structure known from the prior art, FIG. 7 shows an IFFT mapping according to the prior art, and FIGS. 8a to 8d show the time domain properties of the synchronization symbol structure according to the prior art, FIGS. 9a and 9b show the time domain properties, particularly the dynamic range of the synchronization symbol structure according to the prior art, and FIGS. 10a and 10b show the time domain properties of the synchronization symbol structure according to further alternative embodiments of the present invention, According to the present invention the time domain synchronization burst structure as shown in FIG. 6 is maintained. The IFFT mapping as shown in FIG. 7 can be maintained or alternatively the IFFT mapping according to FIG. 3 can be used. The symbol sequences mapped to the subcarriers are optimized to sequences which result in a lower PAPR.

According to the present invention a short OFDM symbol (t1, . . . t6) consists of 12 phase-modulated subcarriers.

| | C00 | C01 | C02 | C03 | C04 | C05 | C06 | C07 | C08 | C09 | C10 | C11 |
|---|---|---|---|---|---|---|---|---|---|---|---|---|
| Seq0 | A | A | A | −A | −A | −A | −A | A | −A | −A | A | −A |
| Seq1 | A | −A | A | A | −A | A | A | A | A | −A | −A | −A |
| Seq2 | A | B | −A | B | −A | −B | B | A | −B | A | −B | −A |
| Seq3 | A | −B | −A | −B | −A | B | −B | A | B | A | B | −A |

with $$A = \exp(j*2+\pi*\varphi_A) \text{ and } B = A*\exp\left(j\frac{\pi}{2}\right) = \exp\left(j2\pi*\varphi_A + j\frac{\pi}{2}\right) \text{ and } 0.0 \le \varphi_A < 1.0.$$

Generally the predefined symbol sequence therefore is chosen such that the envelope fluctuation of the time domain signal of the synchronization burst is minimized.

Therefore generally the predefined symbol sequence is set such that the following equations are satisfied for all symbols for the predefined symbol sequence:

$$n=2m,$$

$$C_{i-1}=\pm C_{n-i}$$

wherein n is a number of symbols of the predefined symbol sequence, m is an integer larger than 1, c is the symbol value, and i is an integer value running from 1 to m.

In the following the time domain signal properties of the new sequences according to the present invention will be shown with reference to FIGS. 4a to 4d and FIGS. 5a to 5d.

For simplicity we use in our demonstration the classical quadriphase symbol alphabet, $$S = \sqrt{\frac{1}{2}}\,(\pm 1 \pm j),$$

(this corresponds to $\phi_A$=0.125)

| Symbol | | |
|---|---|---|
| A | $\exp\left(j\frac{\pi}{4}\right)$ | $\sqrt{\frac{1}{2}}\,(+1+j)$ |
| −A | $-\exp\left(j\frac{\pi}{4}\right) = \exp\left(j\frac{5\pi}{4}\right)$ | $\sqrt{\frac{1}{2}}\,(-1-j)$ |
| B | $\exp\left(j\frac{\pi}{4}+j\frac{\pi}{2}\right) = \exp\left(j\frac{3\pi}{4}\right)$ | $\sqrt{\frac{1}{2}}\,(-1+j)$ |

-continued

| Symbol | | |
|---|---|---|
| −B | $-\exp\left(j\frac{3\pi}{4}\right) = \exp\left(j\frac{7\pi}{4}\right)$ | $\sqrt{\frac{1}{2}}\,(+1-j)$ |

Table 1: Complex symbol mapping

FIGS. 5a and 5b thereby show the time domain signal (magnitude) when using the optimized sequence according to the present invention in the case of no oversampling/8-times oversampling is effected.

PAPR (is decibel) is limited to 2.059 (even when using a time domain oversampling to capture the actual peak).

FIGS. 5c and 5d show the in-phase and quadrature-phase component, respectively, of the resulting wave form. It is clearly visible that the full symbol consists of four repetitions of a short sequence.

FIGS. 5a to 5d show graphics corresponding to FIGS. 4a to 4d for the other proposed sequences S1, S2 and S3.

Further simulations have shown that not only the PAPR can be optimized but also the dynamic range of the signal should be minimized. Therefore another four sequences, with achieve a small PAPR and at the same time a small overall dynamic range are proposed further below.

Using the sequence as proposed in the state of the art the PAPR is 3.01 dB and the dynamic range (defined as the ratio of the peak power to the minimum power) is 30.82 dB (see FIGS. 9a and 9b).

Using the sequences according to the present invention and as described above the PAPR is reduced to 2.06 dB, however, the dynamic range is increased as the signal power is '0' at some points.

Therefore the following four sequences are proposed as a further embodiment of the present invention:

The symbol sequence is C0, C1, . . . C11 and the mapping is:

S=2*{C00, 0, 0, 0, C01, 0, 0, 0, C02, 0, 0, 0, C03, 0, 0, 0, C04, 0, 0, 0, C05, 0, 0, 0, 0, 0, 0, C06, 0, 0, 0, C07, 0, 0, 0, C08, 0, 0, 0, C09, 0, 0, 0, C10, 0, 0, 0, C11}

| | C00 | C01 | C02 | C03 | C04 | C05 | C06 | C07 | C08 | C09 | C10 | C11 |
|---|---|---|---|---|---|---|---|---|---|---|---|---|
| Seq-Alt0 | A | A | A | A | −A | −A | A | −A | −A | A | −A | A |
| Seq-Alt1 | A | −A | A | −A | −A | A | −A | −A | A | A | A | A |
| Seq-Alt2 | A | B | −A | −B | −A | −B | −B | −A | −B | −A | B | A |
| Seq-Alt3 | A | −B | −A | B | −A | B | B | −A | B | −A | −B | A |

with $A = \exp(i * 2 * \pi * \phi_A)$ and $$B = A * \exp\left(j\frac{\pi}{2}\right) = \exp\left(j2\pi * \varphi_A + j\frac{\pi}{2}\right)$$

and $0.0 \leqq \Phi_{A<} 1.0$.

Using these sequences the PAPR is reduced to 2.24 dB and the dynamic range is limited to 7.01 dB as it is shown in FIGS. 10a and 10b.

The advantages are the same as described before, however, the clipping problem is further reduced due to the very limited dynamic range of the signal.

With reference to FIG. 1 and 2 possible implementations of a transmitter according to the present invention will now be explained.

In the transmitter the sync symbol data 1 are prepared and mapped in a IFFT mapping unit 2 to the appropriate IFFT points. The subcarriers of the OFDM system are transformed by a IFFT unit 3 and then the time domain signal is extended in a time extension unit 4 by copying parts of the signals (for example t1, t2 are copied to t5, t6). The time extended signal is then sent to the I/Q modulator 5.

As shown in FIG. 2 alternatively the time domain signal can be precomputed once in a computation unit 7 and then be stored in a memory 6 for the precomputed sample for the time signal. Then the time domain signal of the synchronization burst can be sent to the modulator 5 directly from the memory 6.

With reference to FIG. 3 a modified IFFT mapping scheme will now be explained.

According to this scheme, the principle of setting only every fourth subcarrier of the OFDM system to a non-zero amplitude (see FIG. 7) is abandoned. Therefore the time domain signal achieved according to the mapping scheme of FIG. 3 will not present a periodic nature.

The IFFT size is now only 16 (instead of 64 as it is the case in FIG. 7). Only one of the bursts t1, t2, . . . t6 will be generated. The other bursts can be generated by copying to retain the periodic nature of the synchronization time domain signal necessary for the correlation and synchronization on the receiving side. Therefore for example the time extension unit 4 can perform the copying of the 16-sample burst t1 generated by the IFFT 16 according to FIG. 7 to the other burst t2, t3, . . . t6. Obviously the mapping scheme according to FIG. 3 reduces the computing effort necessary for the IFFT. The periodic nature of the time domain signal of the SYNCH bursts is therefore no longer achieved by the IFFT step, but by copying the burst t1 generated with the simplified IFFT mapping scheme.

The mapping scheme shown in FIG. 3 is also advantageous in combination with the precomputing technique shown in FIG. 2.

According to the present invention therefore a synchronization burst structure to be used in high speed wireless transmission systems is proposed. The synchronization burst is constructed using especially designed OFDM symbols and time domain repetitions. The resulting synchronization burst achieves a high timing detection and frequency offset estimation accuracy. Furthermore the burst is optimized to achieve a very low envelope fluctuation (Low peak-to-average-power-ratio) to reduce the complexity on the receiver and to reduce time and frequency acquisition time at the receiver.

Therefore the synchronization performance can further be improved. As with the scheme according to the present invention the envelope of the OFDM based synchronization burst in the time domain is reduced, the AGC pool-in speed at the receiver can be improved and an accurate time and frequency synchronization can be achieved. Furthermore the synchronization complexity on the receiver side can be reduced due to the reduced resolution requirements necessary due to reduced envelope fluctuation.

The advantages of the present invention can be set forth as following:

An OFDM based SYNCH symbol with a reduced Peak-to-Average-Power-Ratio (PARP) is proposed, Improved synchronization performance (compared to the state of the art proposal), Reduced AGC (automatic gain control) pull-in time due to reduced dynamic range of the SYNCH burst, Improved AGC settlement (AGC has to adjust to a incoming signal level that later on now overflow/underflow in the AD happens. The reduced dynamic range of the SYNCH burst help to find this reference level more accurate), Reduced synchronization detection complexity on the receiver (reduced resolution necessary due to reduced envelope fluctuation).

What is claimed is:

[1. A method for generating synchronization bursts for OFDM transmission systems, comprising the following steps:

mapping the symbols of a predefined symbol sequence according to a predefined mapping scheme on subcarriers S of the OFDM system, wherein the symbols of the predefined symbol sequence represent subcarriers of the OFDM system with non-zero-amplitude, and generating a synchronization burst by Inverse Fourier Transforming the subcarriers S of the OFDM system mapped with the symbols of said predefined symbol sequence, characterized in that the predefined symbol sequence is set such that the envelope fluctuation of the time domain signal of the synchronization burst is minimized and the symbols of the predefined symbols sequence can be expressed as

A −AA −A −AA −A −AAAAA

A being a complex value.]

[2. A method for synchronizing wireless OFDM systems, characterized by the steps of generating a synchronization burst according to a method according to claim 1, and transmitting the synchronization burst.]

[3. A method according to claim 2, characterized in that the time domain signal of the synchronization burst is precomputed and stored in a memory.]

[4. An OFDM transmitter, comprising:

a unit for mapping the symbols of a predefined symbol sequence according to a predefined mapping scheme on subcarriers of the OFDM system, wherein the symbols of the predefined symbol sequence represent subcarriers of the OFDM system with non-zero-amplitude, and a unit for generating a synchronization burst by Inverse Fourier Transforming the subcarriers of the OFDM system mapped with the symbols of said predefined symbol sequence, characterized in that the mapping unit is designed to modulate the subcarriers such that the envelope fluctuation of the time domain signal of the synchronization burst is minimized by using the following predefined symbol sequence:

A −AA −A −AA −A −AAAAA

A being a complex value.]

[5. An OFDM transmitter according to claim 4, characterized by a time extension unit copying the burst part to achieve a periodic nature of the time domain signal.]

[6. An OFDM transmitter according to claim 4, characterized by a processing unit for precomputing the time domain signal of the synchronization burst and a memory for storing the precomputed time domain signal of the synchronization burst.]

[7. A mobile communications device, comprising a transmitter according to claim 4.]

[8. A synchronization burst signal for synchronizing OFDM systems generated by a method according to claim 1.]

*9. A method for synchronizing an OFDM receiver comprising the steps of:*

*generating a synchronization signal by:*

*mapping the symbols of a predefined symbol sequence according to a predefined mapping schemes on subcarriers of the OFDM system, wherein the symbols $C_0, \ldots C_{11}$ of the predefined symbols sequence represent subcarriers of the OFDM system with non-zero amplitude,*

*generating a synchronization signal by Inverse Fourier Transformation of the subcarriers of the OFDM system mapped with the symbols of said predefined sequence, wherein the symbols $C_0, \ldots C_{11}$ comprise twelve symbols wherein $C_n$ has the value*

$$\sqrt{\left(\frac{1}{2}\right)}(\pm 1 \pm j),$$

*where n is an integer,*

*transmitting the synchronization signal, and*

*receiving said synchronization signal and synchronizing a receiver.*

*10. The method of claim 9, wherein automatic gain control in the receiver is locked in using the received synchronization signal.*

*11. The method of claim 9, wherein a reference value of an A/D converter in the receiver is adjusted using the received synchronization signal.*

*12. A method for synchronizing a receiver in an OFDM communication system, comprising the steps of:*

*receiving data signals and a synchronization signal exhibiting periodicity, the data signals and synchronization signal being transmitted from a transmitter using a plurality of subcarriers, said synchronization signal being based on a predefined symbol sequence having twelve symbols $C_0, \ldots C_{11}$ wherein $C_n$ has the value*

$$\sqrt{\left(\frac{1}{2}\right)}(\pm 1 \pm j),$$

*where n is an integer, and wherein said twelve symbols are periodically mapped on every fourth subcarrier of said plurality of subcarriers so that said periodicity of the synchronization signal contains a predefined number of repetitions of one synchronization signal in the time domain, and*

*performing time and frequency synchronization in accordance with said periodicity of synchronization signal.*

*13. A method for synchronizing a receiver in an OFDM communication system, comprising the steps of:*

*receiving data and synchronization signals transmitted from a transmitter using a plurality of subcarriers, and*

*performing time and frequency synchronization in accordance with said synchronization signal,*

*wherein said synchronization signal is generated based on a predefined symbol sequence comprising twelve symbols $C_0, \ldots C_{11}$ wherein $C_n$ has the value*

$$\sqrt{\left(\frac{1}{2}\right)}(\pm 1 \pm j),$$

*where n is an integer.*

*14. A method for synchronizing a receiver in an OFDM communication system, comprising the steps of:*

*receiving data and synchronization signals transmitted from a transmitter using a plurality of subcarriers, and*

*performing time and frequency synchronization in accordance with said synchronization signal,*

*wherein said synchronization signal is generated based on a predefined symbol sequence comprising twelve non-zero symbols $C_0, \ldots C_{11}$ wherein $C_n$ has the value*

$$\sqrt{\left(\frac{1}{2}\right)}(\pm 1 \pm j),$$

*where n is an integer, and other symbols set to zero, so that said twelve symbols are arranged with periodicity in said predefined symbol sequence in the frequency domain.*

*15. A method for synchronizing a receiver in an OFDM communication system, comprising the steps of:*

*receiving data and synchronization signals transmitted from a transmitter using a plurality of subcarriers, and*

*performing time and frequency synchronization in accordance with said synchronization signal,*

*wherein said synchronization signal is generated based on a predefined symbol sequence comprised of twelve symbols $C_0, \ldots C_{11}$ wherein $C_n$ has the value*

$$\sqrt{\left(\frac{1}{2}\right)}(\pm 1 \pm j),$$

*where n is an integer,*

*wherein the twelve symbols are arranged such that every fourth subcarrier among said plurality of subcarriers has non-zero amplitude.*

*16. An OFDM communication system comprising a transmitter and a receiver, the transmitter being of the type that transmits a synchronization signal generated according to the steps of:*

*mapping, in the frequency domain, symbols of a predefined symbol sequence, in accordance with a predefined mapping scheme, on a plurality of subcarriers of the OFDM system, wherein the symbols $C_0, \ldots C_{11}$ of the symbol sequence define subcarriers with non-zero amplitude, and*

*generating a time domain synchronization signal by Inverse Fourier Transforming the subcarriers of the OFDM system mapped with the symbols of the symbol sequence,*

*wherein the symbols of the symbol sequence comprise twelve symbols $C_0, \ldots C_{11}$ wherein $C_n$ has the value*

$$\sqrt{\left(\frac{1}{2}\right)}(\pm 1 \pm j),$$

*where n is an integer; and*

*the receiver being of the type that receives said synchronization signal to perform time and frequency synchronization in accordance with said synchronization signal.*

*17. An OFDM communication system comprising a transmitter and a receiver, the transmitter being of the type that transmits a synchronization signal generated according to the steps of;*

*generating a predefined symbol sequence having twelve symbols $C_0, \ldots C_{11}$ corresponding to respective pre-selected ones of plurality of subcarriers of the OFDM system, and*

*generating said synchronization signal in the time domain by performing Inverse Fourier Transformation on said pre-selected ones of said plurality of subcarriers,*

*wherein said twelve symbols are set to non-zero having complex values and others of said symbols are set to zero, such that said twelve symbols are arranged periodically in said predefined symbol sequence in the frequency domain and*

*wherein $C_n$ of said twelve symbols has the value*

$$\sqrt{\left(\frac{1}{2}\right)}(\pm 1 \pm j),$$

*where n is an integer; and*

*the receiver being of the type that receives said synchronization signal and performs time and frequency synchronization in accordance with said synchronization signal.*

* * * * *